United States Patent
Shimono et al.

(10) Patent No.: US 6,873,847 B2
(45) Date of Patent: Mar. 29, 2005

(54) MOBILE COMMUNICATION SYSTEM USING MULTIPLEX ZONE CONFIGURATION AND OPERATION METHOD OF THE SAME

(75) Inventors: Fumihisa Shimono, Tokyo (JP); Takashi Yonamine, Kanagawa (JP)

(73) Assignee: NEC Corporation, Tokyo (JP)

( * ) Notice: Subject to any disclaimer, the term of this patent is extended or adjusted under 35 U.S.C. 154(b) by 431 days.

(21) Appl. No.: 09/846,192

(22) Filed: May 2, 2001

(65) Prior Publication Data

US 2001/0044306 A1 Nov. 22, 2001

(30) Foreign Application Priority Data

May 11, 2000 (JP) .......................................... 2000-138303

(51) Int. Cl.$^7$ ................................................ H04Q 7/20
(52) U.S. Cl. .................... 455/441; 455/436; 455/67.11; 455/115.3; 455/226.2; 455/226.3; 370/332; 370/333
(58) Field of Search .............................. 455/422.1, 441, 455/449, 443, 444, 524, 525, 436–440, 67.11, 67.13, 115.1, 115.3, 226.1–226.3; 370/331, 332, 333

(56) References Cited

U.S. PATENT DOCUMENTS

| | | | | |
|---|---|---|---|---|
| 5,278,991 A | * | 1/1994 | Ramsdale et al. | 455/444 |
| 5,396,645 A | * | 3/1995 | Huff | 455/441 |
| 5,475,868 A | * | 12/1995 | Duque-Anton et al. | 455/62 |
| 5,548,806 A | * | 8/1996 | Yamaguchi et al. | 455/441 |
| 6,212,389 B1 | * | 4/2001 | Fapojuwo | 455/453 |
| 6,253,084 B1 | * | 6/2001 | Monot | 455/441 |
| 6,256,500 B1 | * | 7/2001 | Yamashita | 455/441 |
| 6,259,919 B1 | * | 7/2001 | Suonvieri et al. | 455/441 |
| 6,285,884 B1 | * | 9/2001 | Vaara | 455/441 |
| 6,408,189 B1 | * | 6/2002 | Nakamura et al. | 455/504 |

FOREIGN PATENT DOCUMENTS

| | | |
|---|---|---|
| JP | 5-14963 | 1/1993 |
| JP | 9-130845 | 5/1997 |

* cited by examiner

Primary Examiner—Temica M. Davis
(74) Attorney, Agent, or Firm—McGinn & Gibb, PLLC

(57) ABSTRACT

A mobile communication system is composed of a plurality of base stations, a mobile terminal, and a base station controller. The base station controller selects a communication base station from among the plurality of base stations based on a velocity of the mobile terminal. The mobile terminal establishes a channel with the communication base station.

10 Claims, 7 Drawing Sheets

MOBILE COMMUNICATION SYSTEM USING MULTIPLEX ZONE CONFIGURATION AND OPERATION METHOD OF THE SAME

BACKGROUND OF THE INVENTION

1. Field of the Invention

The present invention relates to a mobile communication system, and a method for operating the same. More particularly, the present invention relates to a mobile communication system using a multiplex zone configuration.

2. Description of the Related Art

In order to flexibly cope with a difference in topography or traffic, a multiplex zone configuration is often used for a mobile communication system. In the mobile communication system employing a multiplex zone configuration, the congestion in a communication channel is desirably reduced. Furthermore, the call quality between a base station and a mobile terminal is desirably kept at a good condition.

Such a mobile communication system is disclosed in Japanese Laid Open Patent Application (JP-A-Heisei, 9-130845). In the conventional mobile communication system the service area is covered with two kinds of zones, that is, large zones and small zones. The large and small zones overlap with each other. One of the large zones or the small zones is selected for the communication of a mobile terminal. The selection is executed based on the kind of the mobile terminal.

The known mobile communication system, as depicted in FIG. 1, includes a base station controller 101, base stations 102 to 107 and mobile terminals 108, 109, as shown in FIG. 1. The base stations 102 to 107 can communicate with the mobile terminals within the radio zones 102a to 107a, respectively. Here, the radio zones 102a, 103a are the large zones, and the radio zones 104a to 107a are the small zones.

The base station controller 101 sends a control signal indicating whether the radio zone in which the mobile terminal exists is the large zone or the small zone, to the mobile terminals 108, 109 within the radio zones 102a to 107a, through the base stations 102 to 107. The mobile terminals 108, 109 refer to the control signal, and judges whether the mobile terminals 108, 109 exist within the large zone or the small zone.

Which one of the large zone and the small zone is used as a priority zone is defined based on the kind of the mobile terminals 108, 109. Each of the mobile terminals 108, 109 makes a call by preferentially using the radio zone, which is the priority zone, of the large zone and the small zone.

Also, another mobile communication system employing a multiplex zone configuration is disclosed in Japanese Laid Open Patent Application (Jp-A-Heisei 5-14963). In the other mobile communication system, a plurality of small zones are accommodated in a large zone. A hand-over between two of the small zones is carried out based on the receive levels of the channels between a mobile station and the two of the small zones.

In the mobile communication system employing the multiplex zone configuration, the congestion of communication channels between mobile terminals and base stations is desirably reduced. Especially, the congestion of the communication channels is desired to be reduced when traffic of the communication channels between the mobile terminals and the base stations is increased.

Also, in the mobile communication system employing the multiplex zone configuration, it is desirable that a hand-over is not frequently induced even if a mobile terminal moves at a high speed.

Moreover, in the mobile communication system, it is desirable that an unbalance is not easily induced between a load on a base station communicating with a mobile terminal within the large zone and a load on a base station communicating with a mobile terminal within the small zone.

SUMMARY OF THE INVENTION

Therefore, an object of the present invention is to provide a mobile communication system employing a multiplex zone configuration, wherein a congestion of communication channels is reduced between mobile terminals and base stations.

Another object of the present invention is to provide a mobile communication system in which a congestion of the communication channel is reduced while traffic of communication channels between mobile terminals and base stations is increased.

Still another object of the present invention is to provide a mobile communication system employing a multiplex zone configuration in which a hand-over is not frequently induced even if a mobile terminal moves at a high speed.

Yet Still another object of the present invention is to provide a mobile communication system in which an unbalance is not easily induced between a load on a base station communicating with a mobile terminal within a large zone and a load on a base station communicating with a mobile terminal within a small zone.

In order to achieve an aspect of the present invention, a mobile communication system is composed of a plurality of base stations, a mobile terminal, and a base station controller. The base station controller selects a communication base station from among the plurality of base stations based on a velocity of the mobile terminal. The mobile terminal establishes a channel with the communication base station.

In this case, the mobile terminal may establish another channel with another communication base station of the plurality of base stations before establishing the channel. The velocity is desirably calculated based on an bit error rate and a signal to noise ratio of the another channel.

Furthermore, each of the plurality of base stations may include a bit error rate detecting unit detecting the bit error rate, and a signal to noise ration detecting unit detecting the signal to noise ratio.

Also, the mobile terminal may include a bit error rate detecting unit detecting the bit error rate, and a signal to noise ratio detecting unit detecting the signal to noise ratio.

In order to achieve another aspect of the present invention, a mobile communication system is composed of a large zone base station having a first communication area, a small zone base station having a second communication area, a base station controller, and a mobile station. The second communication area is smaller than the first communication area, and overlaps the first communication area. The base station controller selects one of the large zone base station and the small zone base station as a communication base station based on a velocity of the mobile station. The mobile terminal establishes a channel to the communication base station.

The large zone station is desirably selected as the communication station when the velocity is faster than a predetermined velocity.

The small zone station is desirably selected as the communication station when the velocity is slower than another predetermined velocity.

In this case, the large zone station is selected as the communication station when traffic of the small zone base station is heavier than predetermined traffic.

The mobile terminal may establishes another channel with another communication base station of the large zone base station and the small zone base station before establishing the channel. The velocity is desirably calculated based on a bit error rate and a signal to noise ratio of the another channel.

In this case, each of the large zone base station and the small zone base station includes a bit error rate detecting unit detecting the bit error rate, and a signal to noise ration detecting unit detecting the signal to noise ratio.

Also, the mobile terminal may include a bit error rate detecting unit detecting the bit error rate, and a signal to noise ration detecting unit detecting the signal to noise ratio.

In order to achieve still another aspect of the present invention, a mobile communication system is composed of a large zone base station having a first communication area, a small zone base station having a second communication area, a base station controller, and a mobile station. The second communication area is smaller than the first communication area, and overlaps the first communication area. The mobile terminal establishes a first channel with a first communication base station of the large zone base station and the small zone base station. The base station controller selects one of the large zone base station and the small zone base station as a second communication base station based on a bit error rate and a signal to noise ratio of the first channel. The mobile terminal establishes a second channel to the second communication base station.

In order to achieve still another aspect of the present invention, a mobile communication system is composed of a large zone base station having a first communication area, a small zone base station having a second communication area, a base station controller, and a mobile station. The second communication area is smaller than the first communication area, and overlaps the first communication area. The base station controller selects one of the large zone base station and the small zone base station as a communication base station based on traffic of the small zone base station. The mobile terminal establishes a channel to the communication base station.

In order to achieve still another aspect of the present invention, a base station controller used in a mobile communication system is composed of a receiving unit receiving a signal indicative of a velocity of a mobile terminal, and a hand-over directing unit selecting a communication base station from among a plurality of base stations based on the velocity to direct a hand-over to the communication base station.

The signal may indicate a bit error rate and a signal to noise ratio of another channel established between the mobile terminal and another communication base station of the plurality of base stations. In this case, the base station controller desirably calculates the velocity based on the bit error rate and the signal to noise ratio.

In order to achieve still another aspect of the present invention, an operating method of a mobile communication system is composed of:

detecting a velocity of a mobile terminal;

selecting one of a plurality of base stations as a communication base station;

establishing a channel between the mobile terminal and the communication base station.

In order to achieve still another aspect of the present invention, an operating method of a mobile communication system is composed of:

detecting a velocity of a mobile terminal;

selecting one of a large zone base station and a small zone base station as a communication base station, wherein the large zone base station has a first communication area, and the small zone base station has a second communication area, and the second communication area is smaller than the first communication area, and overlaps the first communication area, establishing a channel between the mobile terminal and the communication base station.

In order to achieve still another aspect of the present invention, a velocity detecting unit detecting a velocity of a mobile station is composed of a bit error detecting unit detecting a bit error rate of a channel between the mobile station and a base station, a signal to noise ratio detecting unit detecting a signal to noise ratio of the channel, and a calculation unit calculating a velocity of the mobile station based on the bit error rate and the signal to noise ratio.

In order to achieve still another aspect of the present invention, a method of detecting a velocity of a mobile station is composed of:

detecting a bit error rate of a channel between the mobile station and a base station;

detecting a signal to noise ratio of the channel; and calculating a velocity of the mobile station based on the bit error rate and the signal to noise ratio.

DESCRIPTION OF THE PREFERRED EMBODIMENTS

A mobile communication system of an embodiment according to the present invention will be described below with reference to the attached drawings.

Figure 1:
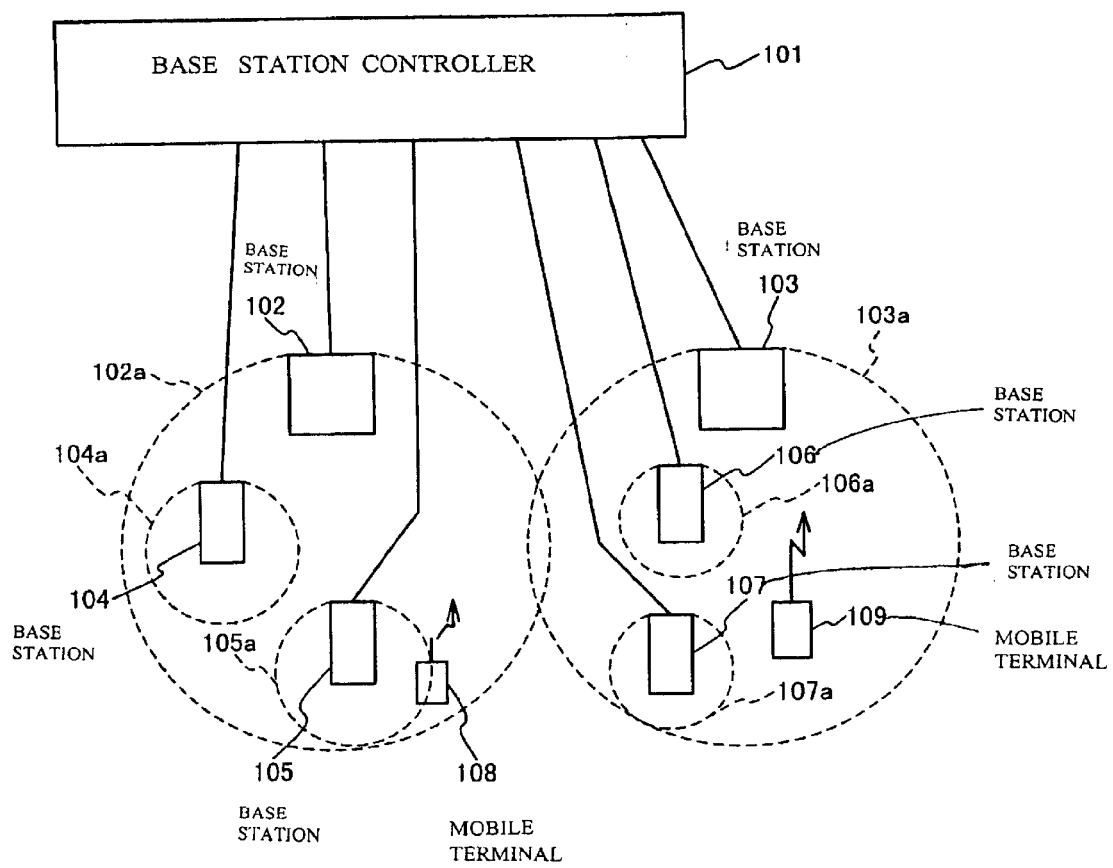
FIG. 1 shows a conventional mobile communication system.
Figure 2:
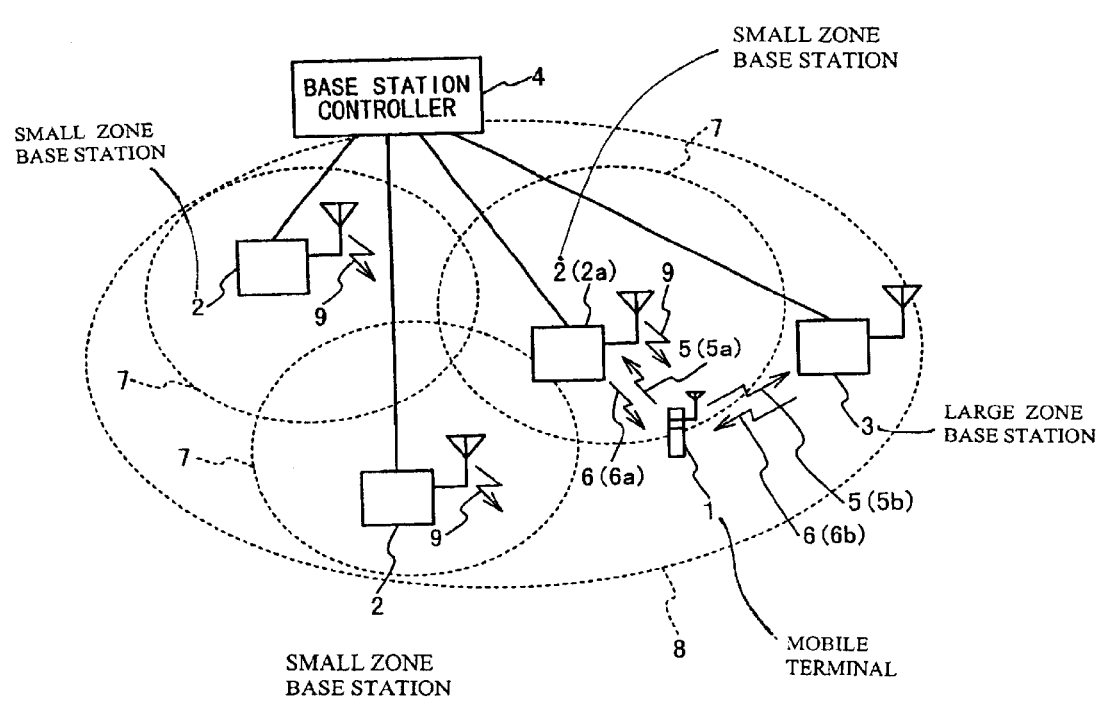
FIG. 2 is a mobile communication system of an embodiment according to the present invention.

The mobile communication system includes a mobile terminal 1, small zone base stations 2, a large zone base station 3 and a control station 4, as shown in FIG. 2. It should be noted that the mobile communication system may further include other small zone base stations and other large zone base stations.

The mobile terminal 1 communicates with the small zone base stations 2 and the large zone base station 3 through ascending communication channels 5 and descending communication channels 6. The ascending communication channels 5 are the communication channels to send signals from the mobile terminal 1 to the small zone base stations 2 and the large zone base station 3. The descending communication channels 6 are the communication channels to send signals from the small zone base stations 2 and the large zone base station 3 to the mobile terminal 1.

A channel among the ascending communication channels 5 used for the mobile terminal 1 to communicate with one of the small zone base stations 2 may be hereafter referred to as an ascending primary channel 5a. Also, a channel among the ascending communication channels 5 used for the mobile terminal 1 to communicate with the large zone base station 3 may be hereafter referred to as an ascending secondary channel 5b. A frequency band of the ascending primary channel 5a is different from that of the ascending secondary channel 5b, and thereby an interference between the ascending primary channel 5a and the ascending secondary channel 5b is avoided.

Furthermore, a channel among the descending communication channels 6 used for the mobile terminal 1 to communicate with one of the small zone base station 2s may be hereafter referred to as a descending primary channel 6a. Also, a channel among the descending communication channels 6 used for the mobile terminal 1 to communicate with the large zone base station 3 may be hereafter referred to as a descending secondary channel 6b. A frequency band of the descending primary channel 6a is different from that of the descending secondary channel 6b, and thereby an interference between the descending primary channel 6a and the descending secondary channel 6b is avoided.

The mobile terminal 1 communicates with one of the small zone base station 2 and the large zone base station 3. However, it should be noted that the mobile terminal 1 may communicate with a plurality of small zone base stations 2 and that the mobile terminal 1 may communicate with a plurality of large zone base stations 3.

Each of the small zone base stations 2 is installed correspondingly to a small zone 7. Each of the small zone base stations 2 can communicate with the mobile terminal 1 when the mobile terminal 1 is located within the small zone 7.

Also, the large zone base station 3 is installed correspondingly to a large zone 8. The large zone base stations 3 can communicate with the mobile terminal 1 when the mobile terminal 1 is located within the large zone 8. Here, the small zone 7 is smaller than the large zone 8, and it is included in the large zone 8. That is, the mobile terminal 1 within the small zone 7 can communicate with the large zone base station 8. Here, a part of the small zone 7 may be located outside the large zone 8. Here, a part of the small zone 7 may be located outside the large zone 8.

The small zone base station 2 and the large zone base station 3 are connected to the control station 4.

The control station 4 provides a communication service through the small zone base station 2 or the large zone base station 3 to the mobile terminal 1. The control station 4 determines any one of the small zone base station 2 and the large zone base station 3 to which the mobile terminal 1 is connected.

When the communication service to the mobile terminal 1 is started, the mobile terminal 1 is firstly connected to one or a plurality of small zone base stations among the small zone base stations 2.

The control station 4 commands the mobile terminal 1 to carry out a hand-over between one of the small zone base stations 2 and the large zone base station 3, depending on the traffic of the one small zone base station 2.

Moreover, the control station 4 commands to the mobile terminal 1 to carry out a hand-over between one of the small zone base stations 2 to the large zone base station 3 depending on the velocity of the mobile terminal 1. At the time, the control station 4 determines a velocity of the mobile terminal 1 based a bit error rate (hereafter, referred to as [BER]) and a ratio of a signal to an interference noise (hereafter, referred to as an Eb/No ratio) of the communication channel 5.

Figure 3:
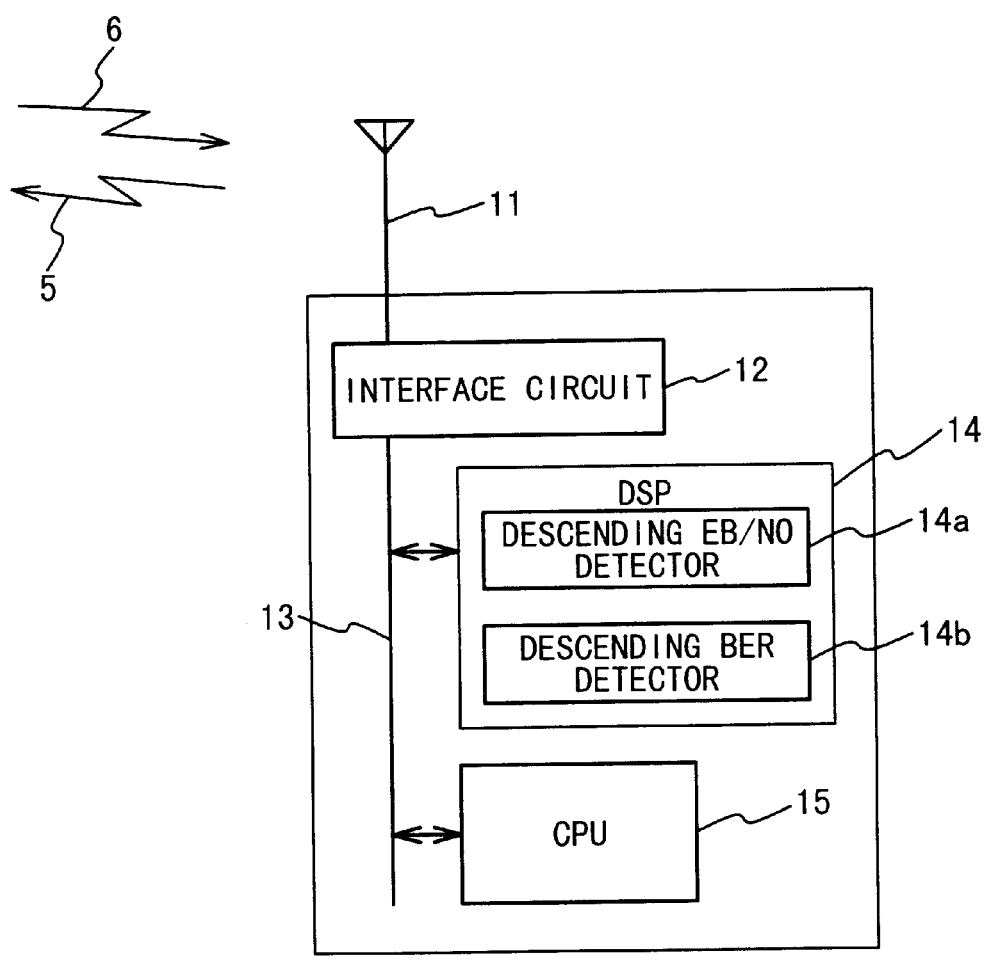
FIG. 3 shows a mobile terminal 1 in an embodiment.

FIG. 3 shows the configuration of the mobile terminal 1. The mobile terminal 1 has an antenna 11, a interface circuit 12, a bus 13, a digital signal processor (DSP) 14 and a CPU 15. The antenna 11 receives an electric wave of the descending communication channel 6, and transmits an electric wave of the ascending communication channel 5.

Here, when the mobile terminal 1 is connected to the small zone base station 2, the ascending primary channel 5a is used among the ascending communication channels 5, and the descending primary channel 6a is used among the descending communication channels 6. Similarly, when the mobile terminal 1 is connected to the large zone base station 3, the ascending secondary channel 5b is used among the ascending communication channels 5, and the descending secondary channel 6b is used among the descending communication channels 6.

The interface circuit 12 demodulates a signal transmitted on the electric wave of the descending communication channel 6, and outputs the signal through the bus 13 to the DSP 14.

The DSP 14 including a descending BER detector 14a and a descending Eb/No ratio detector 14b. The descending BER detector 14a detects the BER of the descending communication channel 6. The descending Eb/No ratio detector 14b detects the Eb/No ratio of the descending communication channel 6.

The CPU 15 controls the mobile terminal 1. The CPU 15 processes the signal sent through the ascending communication channel 5, and generates a transmission signal indicative of the Eb/No ratio and the BER of the descending communication channel 6. The CPU 15 outputs the ascending signal through the bus 13 to the interface circuit 12.

The interface circuit 12 modulates the transmission signal. The modulated transmission signal is transmitted through the antenna 11 to the small zone base station 2 or the large zone base station 3. The interface circuit adjusts the Eb/No of the descending communication channel 6 so that the BER of the descending communication channel 6 is substantially equal to a predetermined desirable value. The BER of the descending communication channel 6 is reported from the small zone base station 2 or the large zone base station 3 through the ascending communication channel 5 to the interface circuit 12. The interface circuit 12 refers to the BER of the ascending communication channel 5, and adjust the Eb/No. In this embodiment, the desirable value of the BER of the ascending communication channel 5 is 0.1%.

Figure 4:
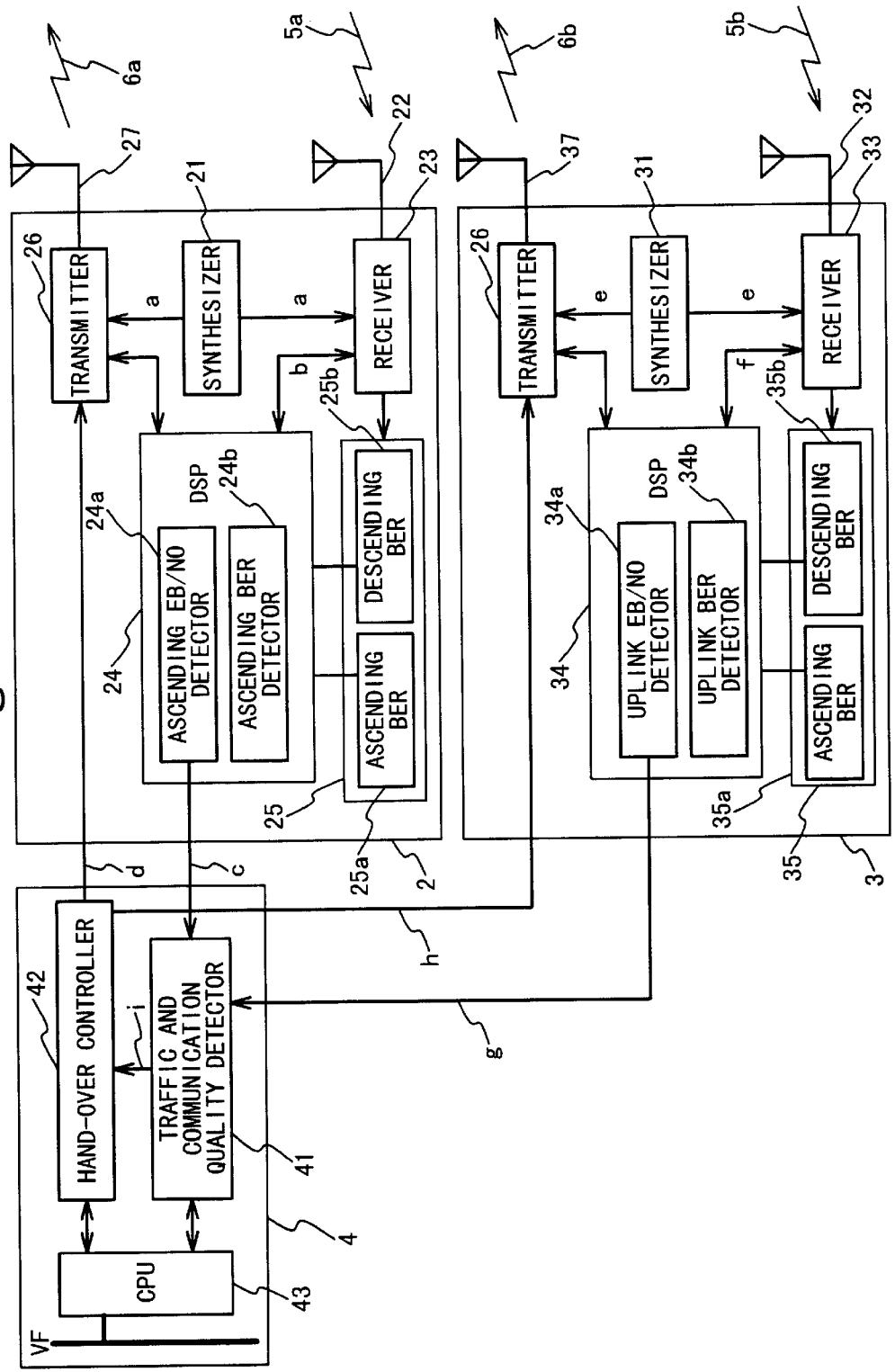
FIG. 4 shows a small zone base station 2, a large zone base station 3 and a control station 4 in an embodiment.

FIG. 4 shows the configuration of the small zone base station 2, the large zone base station 3 and the control station 4.

The small zone base station 2 includes a synthesizer 21, an antenna 22, a reception circuit 23, a DSP 24, a memory 25, a transmission circuit 26 and an antenna 27. The small zone base station 2 communicates with the mobile terminal 1 through the ascending primary channel 5a and the descending primary channel 6a.

The synthesizer 21 sends a synchronous signal a indicative of a synchronous timing to the reception circuit 23 and the transmission circuit 26. The antenna 22 receives the transmission signal of the ascending primary channel 5a sent by the mobile terminal 1. As-mentioned above, the transmission signal of the ascending primary channel 5a indicates the Eb/No ratio and the BER of the descending primary channel 6a detected by the mobile terminal 1. The reception circuit 23 demodulates the transmission signal of the ascending primary channel 5a to send a demodulated transmission signal b to the DSP 24.

The DSP 24 has an ascending BER detection circuit 24a and an ascending Eb/No ratio detection circuit 24b. The ascending BER detection circuit 24a detects the BER of the ascending primary channel 5a, in accordance with the demodulated transmission signal b. The ascending Eb/No ratio detection circuit 24b detects the Eb/No ratio of the ascending primary channel 5a, on the basis of the demodulated transmission signal b.

The DSP 24 sends the Eb/No ratio and the BER of the ascending primary channel 5a, and the Eb/No ratio and the BER of the descending primary channel 6a sent on the demodulation signal b, to the control station 4 on an ascending control signal c.

Moreover, the DSP 24 detects traffic amounts of the ascending primary channel 5a and the descending primary channel 6a, on the basis of the demodulation signal b, and sends that information to the control station 4 on the ascending control signal c.

Moreover, the DSP 24 sends the BER of the ascending primary channel 5a and the BER of the descending primary channel 6a to the memory 25. In the memory 25, the BER of the ascending primary channel 5a is stored in an ascending BER memory 25a, and the BER of the descending primary channel 6a is stored in a descending BER memory 25b, respectively.

The transmission circuit 26 modulates a descending control signal d sent by the control station 4, in accordance with the synchronous signal a generated by the synthesizer 21. The transmission circuit 26 transmits the modulated descending control signal d as the electric wave of the descending primary channel 6a through the antenna 27. At the time, the transmission circuit 26 refers to the BER of the descending primary channel 6a sent by the DSP 24. The transmission circuit 26 transmits the electric wave of the descending primary channel 6a while adjusting the Eb/No ratio of the descending primary channel 6a so that the BER of the descending primary channel 6a is equal to the predetermined desirable value. In this embodiment, the desirable value of the BER of the descending primary channel 6a is 0.1%.

The large zone base station 3 has a synthesizer 31, an antenna 32, a reception circuit 33, a DSP 34, a memory 35, a transmission circuit 36 and an antenna 37.

The synthesizer 31 sends a synchronous signal e indicative of a synchronous timing to the reception circuit 33 and the transmission circuit 36. The antenna 32 receives the transmission signal of the ascending secondary channel 5b sent by the mobile terminal 1. The transmission signal indicates the Eb/No ratio and the BER of the descending secondary channel 6b detected by the mobile terminal 1. The reception circuit 33 demodulates the transmission signal of the ascending secondary channel 5b to send a demodulated transmission signal f to the DSP 34.

The DSP 34 includes an ascending BER detection circuit 34a and an ascending Eb/No ratio detection circuit 34b. The ascending BER detection circuit 34a detects the BER of the ascending secondary channel 5b, in accordance with the demodulated transmission signal f. The ascending Eb/No ratio detection circuit 34b detects the Eb/No ratio of the ascending secondary channel 5b, in accordance with the demodulated transmission signal f.

The DSP 34 sends the Eb/No ratio and the BER of the ascending secondary channel 5b to the control station 4 on a ascending control signal g.

Moreover, the DSP 34 sends the BER of the ascending secondary channel 5b and the BER of the descending secondary channel 6b to the memory 35. In the memory 35, the BER of the ascending secondary channel 5b is stored in an ascending BER memory 35a, and the BER of the descending secondary channel 6b is stored in a descending BER memory 35b, respectively.

The transmission circuit 36 modulates a descending control signal h sent by the control station 4, in accordance with the synchronous signal e generated by the synthesizer 31. The transmission circuit 36 transmits the modulated descending control signal h as the electric wave of the descending secondary channel 6b through the antenna 37. At the time, the transmission circuit 36 refers to the BER of the descending secondary channel 6b sent by the DSP 34. The transmission circuit 36 transmits the electric wave of the descending secondary channel 6b while adjusting the Eb/No ratio of the descending secondary channel 6b so that the BER of the descending secondary channel 6b is equal to the predetermined desirable value. The desirable value of the BER of the descending secondary channel 6b is 0.1%.

The control station 4 includes a traffic/quality detection circuit 41, a hand-over command control circuit 42 and a CPU 43.

The ascending control signal c is inputted to the traffic/quality detection circuit 41. The Eb/No ratio and the BER of the ascending primary channel 5a, the Eb/No ratio and the BER of the descending primary channel 6a, and the traffic of the ascending primary channel 5a and the descending primary channel 6a are sent to the control station 4 on the ascending control signal c, as described above.

The traffic/quality detection circuit 41 judges whether or not the traffic of the ascending primary channel 5a and the descending primary channel 6a are heavier than predetermined traffic.

Moreover, the traffic/quality detection circuit 41 judges whether or not the velocity of the mobile terminal 1 communicating with the small zone base station 2 is faster than a predetermined velocity. The velocity of the mobile terminal 1 is calculated on the basis of the Eb/No ratio and the BER of the ascending primary channel 5a, and the Eb/No ratio and the BER of the descending primary channel 6a.

The ascending control signal g is further inputted to the traffic/quality detection circuit 41. The Eb/No ratio and the BER of the ascending secondary channel 5b and the Eb/No ratio and the BER of the descending secondary channel 6b are sent to the control station 4 on the ascending control signal g, as described above The traffic/quality detection circuit 41 judges whether or not the velocity of the mobile terminal 1 communicating with the large zone base station 3 is slower than a predetermined value. The velocity of the mobile terminal 1 is calculated on the basis of the Eb/No ratio and the BER of the ascending secondary channel 5b, and the Eb/No ratio and the BER of the descending secondary channel 6b.

The traffic/quality detection circuit 41 outputs a trigger signal i to the hand-over command control circuit 42 in response to the traffic of the ascending primary channel 5a and the descending primary channel 6a and the velocity of the mobile terminal 1, and While receiving the trigger signal i, the hand-over command control circuit 42 determines any of the small zone base stations 2 and the large zone base stations 3 to which the mobile terminal 1 carries out the hand-over.

Figure 5:
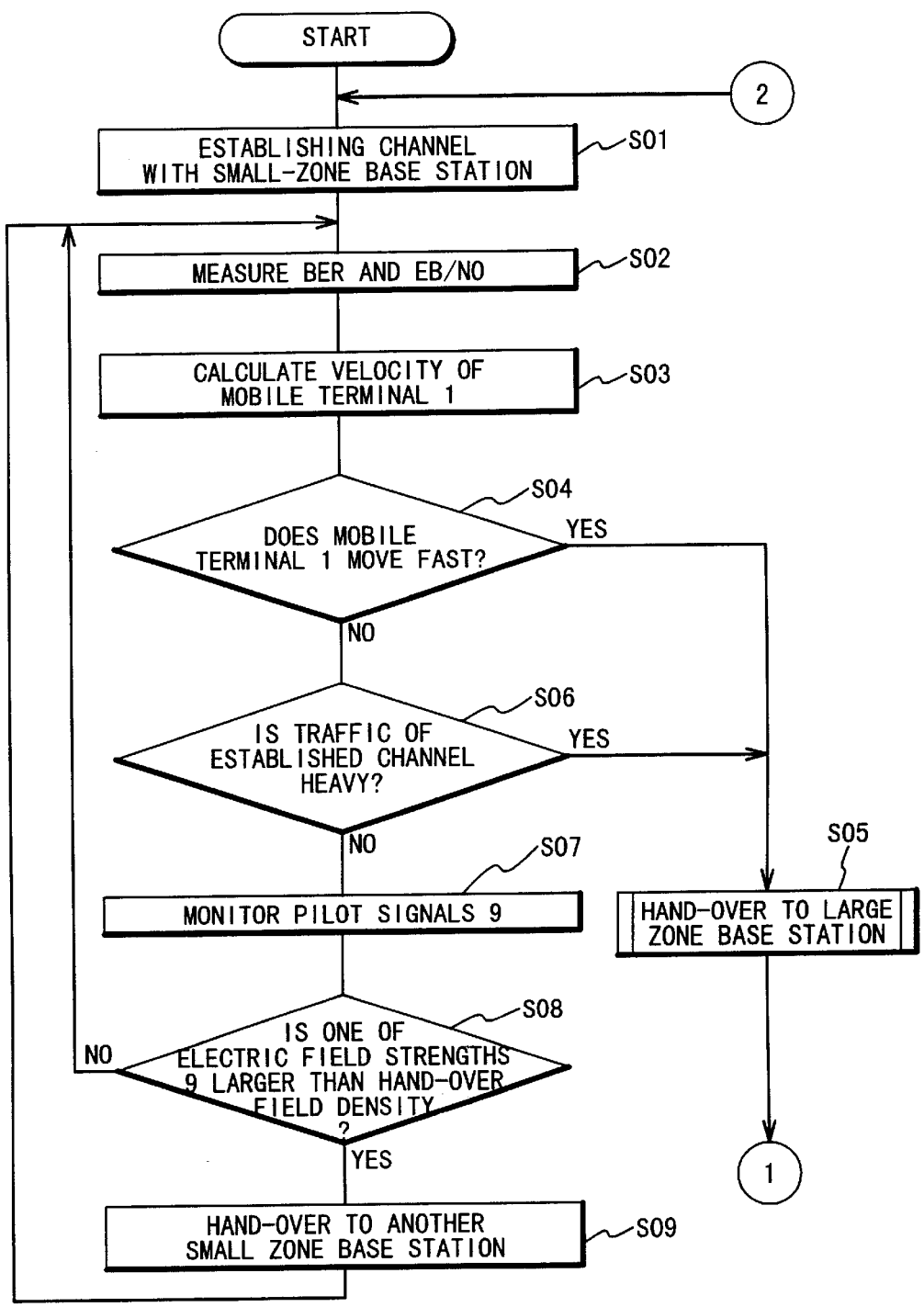
FIG. 5 is a flowchart showing an operation method of a mobile communication system in an embodiment according to the present invention, and especially showing an operation method of the mobile communication system when the mobile terminal 1 is connected to the small zone base station 2.
Figure 6:
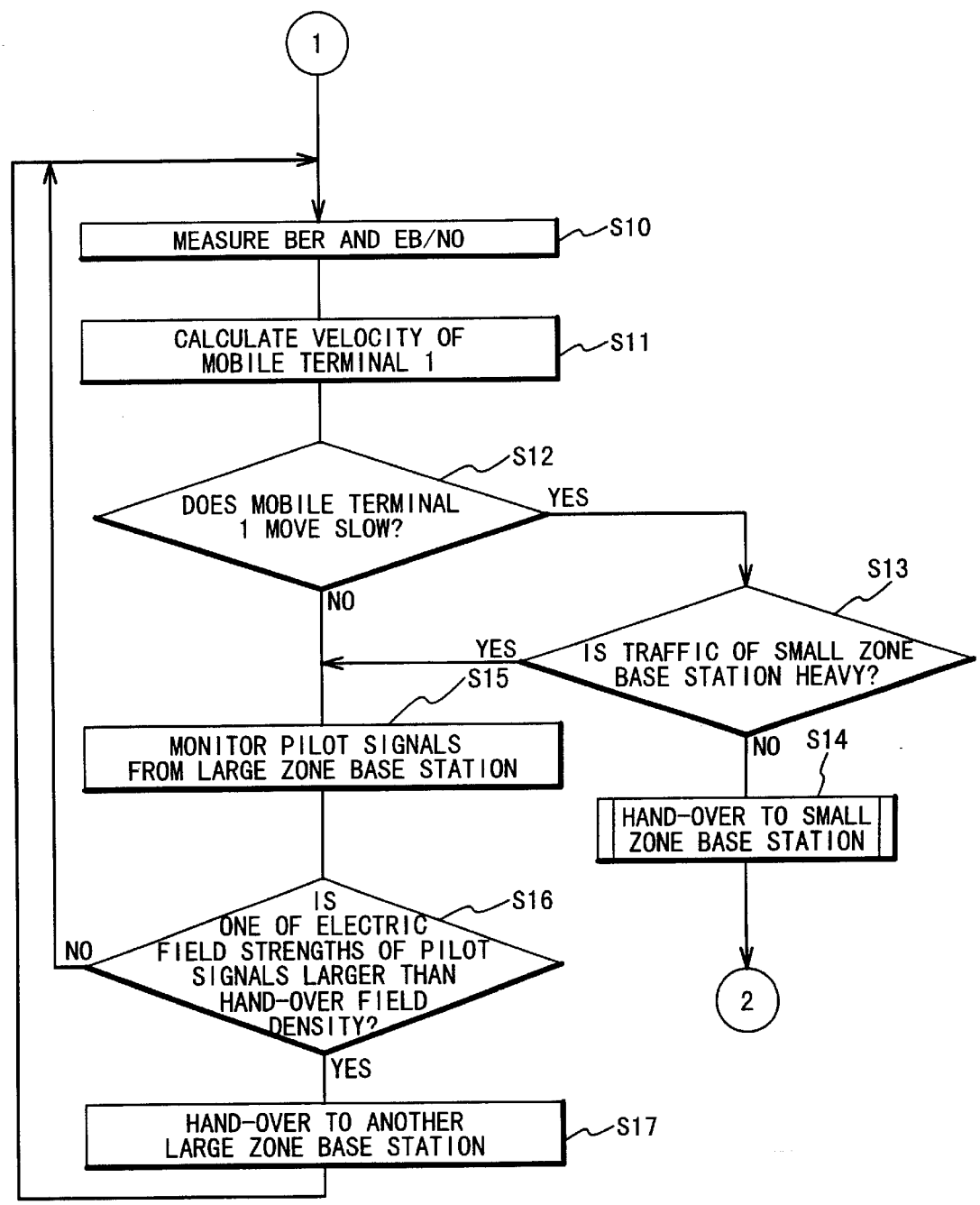
FIG. 6 is a flowchart showing an operation method of a mobile communication system in an embodiment according to the present invention, and especially showing an operation method of the mobile communication system when the mobile terminal 1 is connected to the large zone base station 2.

FIGS. 5 and 6 are flowcharts showing the operation of the mobile communication system.

As shown in FIG. 5, when a mobile terminal 1 starts a communication, the mobile terminal 1 firstly receives a pilot signal 9 sent by each of the small zone base stations 2. The mobile terminal 1 establish the ascending primary channel 5a and the descending primary channel 6a with the one of the small zone base stations 2 transmitting the pilot signal 9 having the strongest electric field (Step S01). Hereinafter, the station with which the mobile terminal 1 establishes the channels is referred to as a small zone base station 2a.

In succession, the Eb/No ratio and the BER of the ascending primary channel 5a are measured by the small zone base station 2a. In addition, the Eb/No ratio and the BER of the descending primary channel 6a are measured by the mobile terminal 1, and reported through the ascending primary channel 5a to the small zone base station 2a (Step S02). The Eb/No ratio and the BER of the ascending primary channel 5a, and the Eb/No ratio and the BER of the descending primary channel 6a are reported to the control station 4.

In succession, the control station 4 calculates the velocity of the mobile terminal 1 on the basis of the Eb/No ratio and the BER of the ascending primary channel 5a (Step S03). The control station 4 judges whether or not the velocity of the mobile terminal 1 is faster than a predetermined value in accordance with (Step S04).

Figure 7:
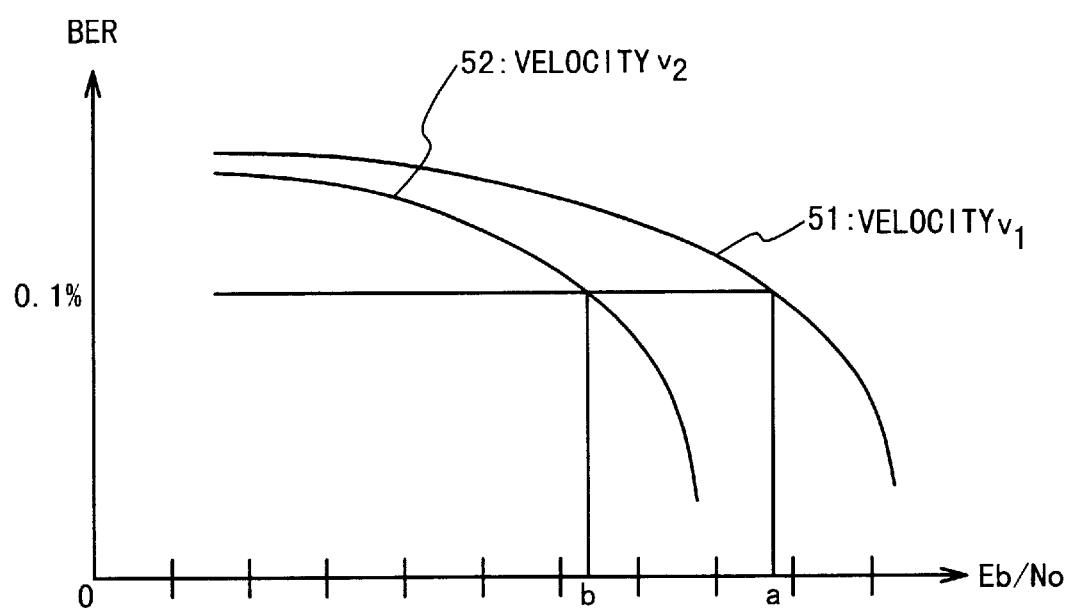
FIG. 7 shows a relation between the bit error rate (BER) and the signal to noise ratio (Eb/No) and a velocity of the mobile terminal 1.

FIG. 7 shows the relation between the BER and the Eb/No ratio. Curves 51, 52 show the relations between the BER and the Eb/No ratio when the mobile terminal 1 moves at speeds of $v_1$, $v_2$, respectively. Here, $v_1 > v_2$. The larger the Eb/No ratio, the smaller the BER. Also, the faster the velocity of the mobile terminal 1, the larger the BER. That is, as the speed of the mobile terminal 1 is faster, the quality of the communication is degraded.

The velocity of the mobile terminal 1 can be calculated from the relation between the BER and the Eb/No ratio shown in FIG. 7. For example, as shown in FIG. 7, if the Eb/No ratio is a when the BER is 0.1%, the velocity of the mobile terminal 1 is calculated as $v_1$. Similarly, if the Eb/No ratio is b when the BER is 0.1%, the velocity of the mobile terminal 1 is calculated as $v_2$. The velocity of the mobile terminal 1 can be singly calculated from the BER and the Eb/No ratio.

If the velocity of the mobile terminal 1 is judged to be greater than a predetermined value $v_{std}$ (Step S04), the hand-over is carried out from the small zone base station 2a to the large zone base station 3 (Step S05).

If the velocity of the mobile terminal 1 is judged to be less than the predetermined value $v_{std}$ (Step S04), it is further judged whether or not traffic of the small zone base station 2a is at a congestion state (Step S06). If traffic of the small zone base station 2a is judged to be greater than a predetermined traffic, a hand-over is carried out from the small zone base station 2a to the large zone base station 3 (Step S05). If the traffic of the small zone base station 2a is judged to be not at the congestion state, a hand-over is not carried out from the small zone base station 2a to the large zone base station 3.

When the hand-over to the large zone base station 3 is not carried out, the mobile terminal 1 monitors the pilot signals 9 sent by the small zone base stations 2 (Step S07).

If the mobile terminal 1 detects that an electric field strength of one pilot signal 9 among the plurality of pilot signals 9 is greater than a predetermined value (Step S08), the mobile terminal 1 requests the control station 4 to perform the hand-over on the small zone base station 2 outputting the one pilot signal 9. The control station 4 judges whether or not it is effective to perform the hand-over on the small zone base station 2 outputting the one pilot signal 9. If it is effective to perform the hand-over, the control station 4 commands the mobile terminal 1 to carry out the hand-over to the small zone base station 2 outputting the one pilot signal 9. The mobile terminal 1 carries out the hand-over to the small zone base station 2 (Step S09).

On the other hand, if the mobile terminal 1 does not detect that the electric field strength of any of the pilot signals 9 is greater than the predetermined value, the hand-over is not carried out.

The processes at the steps S02 to S09 are repeated until the execution of the hand-over to the large zone base station 3 or until the completion of the communication. In the processes at the steps S02 to S09, the order may be changed to an extent that the purpose is not damaged.

FIG. 6 is the flowchart showing the operation of the mobile communication system when the hand-over to the large zone base station 3 is carried out.

The mobile terminal 1 carrying out the hand-over to the large zone base station 3 communicates with the large zone base station 3 through the ascending secondary channel 5b and the descending secondary channel 6b.

After the hand-over to the large zone base station 3, the Eb/No ratio and the BER of the ascending secondary channel 5b are detected by the large zone base station 3 (Step S10).

The velocity of the mobile terminal 1 is detected on the basis of the Eb/No ratio and the BER of the ascending secondary channel 5b (Step S11). The velocity of the mobile terminal 1 is detected by the process identical to that of the step 503. If the velocity of the mobile terminal 1 is judged to be smaller than a predetermined value vstd' (Step S12), it is then judged whether or not the traffic of the small zone base Station 2 is at the congestion state (Step 13). If the traffic of the small zone base station is not at the congestion state, the hand-over to the small zone base station is carried out (Step 14). The one of the small zone base stations 2 to which the hand-over is carried out is determined on the basis of the electric field strength (Step S01).

If the velocity of the mobile terminal 1 is greater than the predetermined value $v_{std}'$ or if the traffic of the small zone base station 2 is at the congestion state, the hand-over to the small zone base station 2 is not carried out.

At the moment, the mobile terminal 1 monitors the pilot signals (not shown) sent by the other large zone base stations (not shown) (Step S15).

If a pilot signal whose electric field strength is stronger than the predetermined value is detected from the pilot signals (not shown) sent by the other large zone base stations (not shown) (Step S16), the mobile terminal 1 carries out the hand-over to the large zone base station (not shown) outputting the pilot signal, as necessary (Step S17).

The processes at the steps S10 to S17 are repeated until the execution of the hand-over to the small zone base station 2 or until the completion of the communication. In the processes at the steps S10 to S17, the order may be changed to an extent that its purpose is not damaged The processes at the steps 01 to S17 are executed in accordance with a program recorded in a record medium.

In the mobile communication system of this embodiment, if the traffic of the small zone base station 2 is at the congestion state, the hand-over is carried out from the small zone base station 2 to the large zone base station 3. This results in the reduction in the congestion of the traffic of the small zone base station 2.

Also, in the mobile communication system of this embodiment, if the mobile terminal 1 moves at the high speed, the hand-over is carried out from the small zone base station 2 to the large zone base station 3. Since the large zone base station 3 covers the large region, the frequency of the hand-over can be suppressed even if the mobile terminal 1 moves at the high speed.

On the other hand, if the mobile terminal 1 moves at a low speed or it does not move, the hand-over is carried out from the large zone base station 3 to the small zone base station 2. If the mobile terminal 1 moves at the low speed or it does not move, even when the mobile terminal 1 is connected to the small zone base station 2, the frequency of the hand-over is also small.

In this way, the mobile communication system of this embodiment suppresses the frequency of the hand-over.

In the mobile communication system of this embodiment, the hand-over from the small zone base station 2 to the large zone base station 3 and the hand-over from the large zone base station 3 to the small zone base station 2 are carried out in accordance with the predetermined condition. Thus, the load between the small zone base station 2 and the large zone base station 3 is balanced.

At the step S03 of this embodiment, it is also possible to judge whether or not the mobile terminal 1 moves at the high speed, in accordance with the Eb/No ratio and the BER of the descending primary channel 6a. In this case, at the step S02, the Eb/No ratio and the BER of the descending primary channel 6a are detected by the mobile terminal 1.

Moreover, at the step S11, it is also possible to judge whether or not the mobile terminal 1 moves at the high speed, in accordance with the Eb/No ratio and the BER of the descending secondary channel 6b. In this case, at the step S10, the Eb/No ratio and the BER of the descending secondary channel 6b are detected by the mobile terminal 1.

Moreover, in the mobile communication system of this embodiment, any of the traffic amount of the small zone base station 3 and the velocity of the mobile terminal 1 may not be referred at the hand-over from the small zone base station 2 to the large zone base station 3 and/or the hand-over from the large zone base station 3 to the small zone base station 2.

What is claimed is:

1. A mobile communication system comprising:
   a plurality of base stations;
   a mobile terminal; and
   a base station controller, wherein:
   said base station controller establishes a communication channel between said mobile terminal and a first one of said plurality of base stations;
   said base station controller determines a first bit error rate and a first signal to noise ratio, calculates a first velocity of said mobile terminal from the first bit error rate and first signal to noise ratio, selects a second one of said base stations based on the first velocity of said mobile terminal, and establishes a communication channel between said mobile terminal and said second one of said base stations; and
   said base station controller measures a second bit error rate and a second signal to noise ratio, calculates a second velocity of said mobile terminal based on the second bit error rate and second signal to noise ratio, and based on the second velocity of said mobile terminal, reestablishes the communication channel between said mobile terminal and said first one of said base stations.

2. The mobile communication system according claim 1, wherein said mobile terminal establishes a communication channel with another base station of said plurality of base stations before establishing said communication channel with said first one of said base stations.

3. The mobile communication system according claim 1, wherein each of said plurality of base stations includes:
   a bit error rate detecting unit for detecting said bit error rate, and
   a signal to noise ration detecting unit for detecting said signal to noise ratio.

4. The mobile communication system according claim 1, wherein said mobile terminal includes:
   a bit error rate detecting unit for detecting said bit error rate, and
   a signal to noise ratio detecting unit for detecting said signal to noise ratio.

5. A mobile communication system comprising:
   a large zone base station having a first communication area;
   a small zone base station having a second communication area;
   a base station controller; and
   a mobile station, wherein:
   (A) the communication area of said small zone base station is smaller than the communication area of said large zone base station, and at least a portion of said small zone communication area overlaps at least a portion of said large zone communication area;
   (B) said base station controller establishes a communication channel between said mobile terminal and said small zone base station;
   (C) the controller measures a first bit error rate and a first signal to noise ratio of signals between the mobile terminal and the small zone base station with which communication is established, calculates a first velocity of the mobile terminal based on the measured first bit error rate and first signal to noise ratio, and compares the calculated first velocity with a first preselected velocity;
   (D) when the first velocity of said mobile station exceeds the first preselected velocity, the base station controller establishes a communication channel between said mobile terminal and said large zone base station, and then:
      (i) the controller measures a second bit error rate and a second signal to noise ratio of signals between the mobile terminal and the large zone base station, calculates a second velocity of the mobile terminal based on the measured second bit error rate and second signal to noise ratio, and compares the calculated second velocity with a second preselected velocity;
      (ii) when the calculated second velocity is less than the second preselected velocity, the controller determines a first amount of traffic of the small zone base station; and (iii) when the first amount of traffic is less than a first preselected amount said base station controller reestablishes communication between said mobile terminal and said small zone base station and returns to (C);
(E) when the calculated first velocity does not exceed the first preselected velocity, the controller determines a second amount of traffic of the small zone base station;
(F) when the second amount of traffic is more than a second preselected amount, the controller establishes the communication channel between said mobilize terminal and said large zone base station and proceeds to (i); and
(G) when the second amount of traffic is less than the second preselected amount, the controller returns to (C).

6. The mobile communication system according claim 5, wherein said mobile terminal establishes a communication channel with another base station before establishing communication with said small zone base station.

7. The mobile Communication system according claim 5, wherein said mobile terminal includes:
   a bit error rate detecting unit for detecting said bit error rate, and
   a signal to noise ratio detecting unit for detecting said signal to noise ratio.

8. An operating method of a mobile communication system comprising:
   (A) detecting a first velocity of a mobile terminal;
   (B) selecting a first one of a plurality of base stations based on the detected velocity;
   (C) establishing a first communication channel between said mobile terminal and said first base station;
   (D) establishing a second communication channel between said mobile terminal and a second one of said plurality of base stations, wherein said second communication channel is selected by:
      (i) detecting a first bit error rate of said second communication channel,
      (ii) detecting a first signal to noise ratio of said second communication channel,
      (iii) calculating a second velocity of said mobile terminal based on the detected bit error rate and the detected signal to noise ratio;
      (iv) comparing the calculated second velocity with a first preselected velocity;
      (v) when the calculated second velocity exceeds the first preselected velocity, establishing the second communication channel between the mobile terminal and the second one of the plurality of base stations; and then:
         (a) measuring a second bit error rate of signals between the mobile terminal and the second one of the base stations;
         (b) measuring a second signal to noise ratio of signals between the mobile terminal and the second one of the base stations;
         (c) calculating a third velocity of the mobile terminal based on the measured second bit error rate and second signal to noise ratio;
         (d) comparing the calculated third velocity with a second preselected velocity;
         (e) when the calculated third velocity is less than the second preselected velocity, determining a first amount of traffic of the first one of the base stations;
         (f) when the first amount of traffic is less than a first preselected amount, reestablishing the first communication channel between said mobile terminal and the first one of said plurality of base stations, and returning to (i);
         (g) when the calculated third velocity is not less than the second preselected velocity or the first amount of traffic is not less than the first preselected amount, returning to (a);
      (vi) when the calculated second velocity does not exceed the first preselected velocity, determining a second amount of traffic of the small zone base station;
      (vii) when the second amount of traffic is more than a second preselected amount, establishing the second communication channel between the mobile terminal and the second one of the plurality of base stations, and proceeding to (a); and
      (viii) when the second amount of traffic is less than the second preselected amount, reestablishing the first communication channel between said mobile terminal and the first one of said plurality of base stations, and returning to (i).

9. A method of operating a mobile communication system including a mobile terminal, a plurality of small zone base stations, and a plurality of large zone base stations, said method comprising:
   (A) determining a first electric field strength between the mobile terminal and at least some of the small zone base stations;
   (B) establishing a communication channel between the mobile terminal and the small zone base station having the greatest electric field strength;
   (C) measuring a first bit error rate of signals between the mobile terminal and the small zone base station with which communication is established;
   (D) measuring a first signal to noise ratio of signals between the mobile terminal and the small zone base station with which communication is established;
   (E) calculating a first velocity of the mobile terminal based on the measured first bit error rate and first signal to noise ratio;
   (F) comparing the calculated first velocity with a first preselected velocity;
   (G) when the calculated first velocity exceeds the first preselected velocity, then:
      (i) establishing a communication channel between the mobile terminal and a first one of the large zone base stations;
      (ii) measuring a second bit error rate of signals between the mobile terminal and the large zone base station with which communication is established;
      (iii) measuring a second signal to noise ratio of signals between the mobile terminal and the large zone base station with which communication is established;
      (iv) calculating a second velocity of the mobile terminal based on the measured second bit error rate and second signal to noise ratio;
      (v) comparing the calculated second velocity with a second preselected velocity;
      (vi) when the calculated second velocity is less than the second preselected velocity, determining a first amount of traffic of the small zone base station with which the electric field strength is greatest;
      (vii) when the first amount of traffic is less than a first preselected amount, returning to (B);

(viii) when the calculated second velocity is not less than the second preselected velocity or the first amount of traffic is not less than the first preselected amount, determining a second electric field strength between the mobile terminal and another one of the large zone base stations;

(ix) when the second electric field strength is less than the electric field strength between the mobile terminal and the large zone base station with which communication is established, returning to (ii);

(x) when the second electric field strength is not less than the electric field strength between the mobile terminal and the large zone base station with which communication is established, establishing a communication channel between the mobile terminal and the another one of the large zone base stations and returning to (ii);

(H) when the calculated first velocity does not exceed the first preselected velocity, determining a second amount of traffic of the small zone base station with which communication is established;

(I) when the second amount of traffic is more than a second preselected amount, proceeding to (i);

(J) when the second amount of traffic is less than the second preselected amount, determining the electric field strength between the mobile terminal and other ones of the small zone base stations;

(K) when one of the other ones of the small zone base stations has a greater electric field strength than the small zone base station with which communication is established, establishing communication channel between the mobile terminal and the small zone base station having the greatest electric field strength;

(L) when none of the other ones of the small zone base stations has a greater electric field strength than the electric field strength of the small zone base station with which communication is established, returning to (C).

10. A mobile communication system, comprising a mobile terminal, a plurality of small zone base stations, a plurality of large zone base stations, and a controller, wherein:

(A) when a communication channel is established between the mobile terminal and one of the small zone base stations, the controller measures a first bit error rate and a first signal to noise ratio of signals between the mobile terminal and the small zone base station with which communication is established, calculates a first velocity of the mobile terminal based on the measured first bit error rate and first signal to noise ratio, and compares the calculated first velocity with a first preselected velocity;

(B) when the calculated first velocity exceeds the first preselected velocity, the controller establishes a communication channel between the mobile terminal and a first one of the large zone base stations;

(C) the controller measures a second bit error rate and a second signal to noise ratio of signals between the mobile terminal and the large zone base station with which communication is established, calculates a second velocity of the mobile terminal based on the measured second bit error rate and second signal to noise ratio, and compares the calculated second velocity with a second preselected velocity;

(D) when the calculated second velocity is less than the second preselected velocity, the controller determines a first amount of traffic of the small zone base station having the greatest electric field strength;

(E) when the first amount of traffic is less than a first preselected amount, the controller establishes communication with said small zone base station having the greatest electric field strength and proceeds to (A);

(F) when the first amount of traffic is not less than the first preselected amount or the calculated second velocity is not less than the second preselected velocity, the controller determines a second electric field strength between the mobile terminal and another one of the large zone base stations;

(G) when the second electric field strength is less than the electric field strength between the mobile terminal and the large zone base station with which communication is established, the controller proceeds to (C);

(H) when the second electric field strength is not less than the electric field strength between the mobile terminal and the large zone base station with which communication is established, the controller establishes a communication channel between the mobile terminal and the another one of the large zone base stations and proceeds to (C);

(I) when the calculated first velocity does not exceed the first preselected velocity, the controller determines a second amount of traffic of the small zone base station with which communication is established;

(J) when the second amount of traffic is more than a second preselected amount, the controller proceeds to (B);

(K) when the second amount of traffic is less than the second preselected amount, the controller determines the electric field strength between the mobile terminal and other ones of the small zone base stations;

(L) when one of the other ones of the small zone base stations has a greater electric field strength than the small zone base station with which communication is established, the controller establishes a communication channel between the mobile terminal and the small zone base station with the best electric field strength;

(M) when none of the other ones of the small zone base stations has a greater electric field strength than the electric field strength of the small zone base station with which communication is established, the controller proceeds to (A).

\* \* \* \* \*